(No Model.)
J. A. GUINN.
SWIVEL FOR CHAINS OR PULLEYS.
No. 576,574. Patented Feb. 9, 1897.
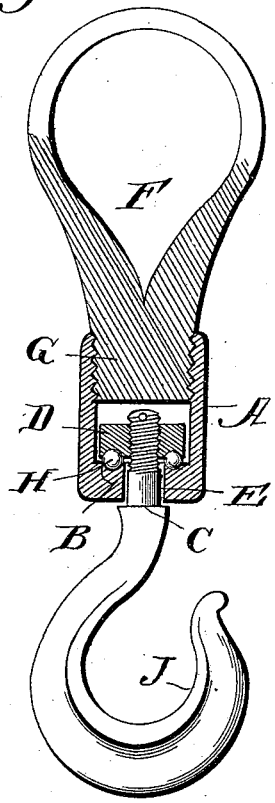
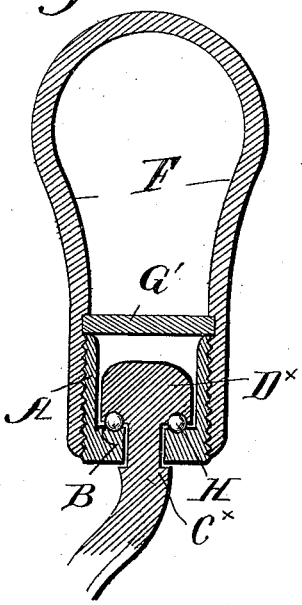
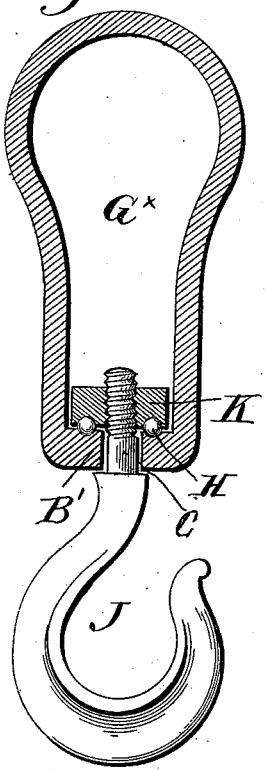
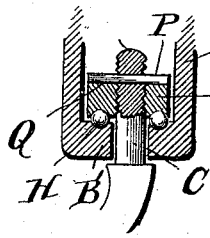
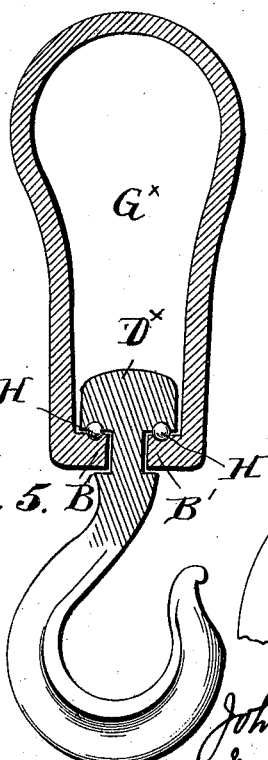
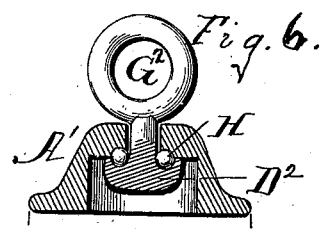
Witnesses:
J. B. McGirr.
Geo. M. Copenhaver.
Inventor
John Alexander Guinn
by Robert Aiton
Atty.

UNITED STATES PATENT OFFICE.

JOHN ALEXANDER GUINN, OF PERRY, IOWA, ASSIGNOR OF ONE-HALF TO FRED HOOKER, OF DES MOINES, IOWA.

SWIVEL FOR CHAINS OR PULLEYS.

SPECIFICATION forming part of Letters Patent No. 576,574, dated February 9, 1897.

Application filed December 2, 1895. Serial No. 570,790. (No model.)

*To all whom it may concern:*

Be it known that I, JOHN ALEXANDER GUINN, a citizen of the United States, residing at Perry, in the county of Dallas and State of Iowa, have invented certain new and useful Improvements in Swivels for Chains or Pulleys; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in swivels for chains or pulleys; and it consists of the combination and arrangements of parts hereinafter set forth and claimed.

In the drawings which form a part of this specification, Figure 1 represents a partial sectional and partial side view of a swivel embodying my invention. Figs. 2, 3, 4, and 5 represent sectional views of modifications of the same. Fig. 6 represents a sectional view of a modification adapted to a pulley-block.

Similar letters refer to like parts in the different figures.

A designates a cup or socket formed of a tubular piece of metal or other suitable material having on its inner wall a shoulder B, preferably of curved or rounded form in cross-section.

C designates the bolt or spindle of the hook member J and has on a threaded reduced portion of its end a nut D, which forms a head, between which and the said shoulder B the antifriction-balls H are held, the under side of said head D having also a rounded face. The said head D rests within the larger bore E of the cup and serves to hold the hook in place, as well as forming a bearing for said balls. The eye member F of the swivel has a threaded lower end G, which is threaded and inserted into the upper end of said cup, closing the same, thus preventing dirt from entering the cup A.

It will be seen that the parts thus described are simple in construction and are readily either separated or assembled when desired and can be replaced if lost or injured at a slight cost.

In the form shown in Fig. 2 the hook is passed through the opening in the cup, the head $D^\times$ being first formed integral therewith and the antifriction-balls H being placed between said head and cup. The spindle or shank of the hook is then flattened or broadened and a shoulder $C^\times$ formed thereon adjacent to said opening, whereby the longitudinal play of said spindle is limited. The connecting end of the eye member is hollow and is interiorly threaded to engage the threaded outer face of the cup A. A disk G' is inserted in the tubular end of the said eye member to strengthen the same and also to prevent dust or dirt from entering said cup from that side.

In Fig. 3 the spindle C is inserted in the tubular end B' of the eye member $G^\times$, and is held in place by a nut K, which forms a head for the bearing of the antifrictional balls H, as in Fig. 1.

In Fig. 5 the hook with head and spindle is formed like that in Fig. 2.

In Fig. 4 a key P is shown as passed through the threaded end of the spindle C, said key resting in a slot Q in the nut R on said spindle.

In Fig. 6 an eye member $G^2$ has its spindle C' inserted in an opening in the pulley-block A', the inner end of the said spindle being upset, forming the head $D^2$, between which and the inner face of the pulley-block are the antifriction-balls H.

Having thus described my invention, what I claim, and desire to secure by Letters Patent, is—

1. A swivel for chains and pulleys having a hook member provided with a spindle having a head integral therewith, a cup in which said head is held, antifrictional balls between said head and cup, an eye member connected with said cup and a detachable guard inserted in said cup, closing the same above said head, said parts being combined substantially as described.

2. A swivel for chains and pulleys having a hook member provided with a spindle with a head thereon, a cup in which said head is held, antifrictional balls forming a bearing for said head, an eye member secured to the outer face of said cup and a guard inserted in said cup above said head closing the same, said parts being combined substantially as described.

3. A swivel for chains or pulleys having a cup with an eye member connected therewith, a hook with a spindle having a head in said cup antifrictional balls forming a bearing for said head, and a detachable guard closing said cup above said head, said spindle having a shoulder thereon below said cup, said parts being combined substantially as described.

In testimony whereof I affix my signature in presence of two witnesses.

JOHN ALEXANDER GUINN.

Witnesses:
H. A. HOYT,
A. L. BROWN.